Dec. 12, 1961  J. E. BRIDGES  3,013,114
DISPLAY DEVICE WITH CONTRAST IMPROVING OPTICAL FILTER
Filed Feb. 21, 1958
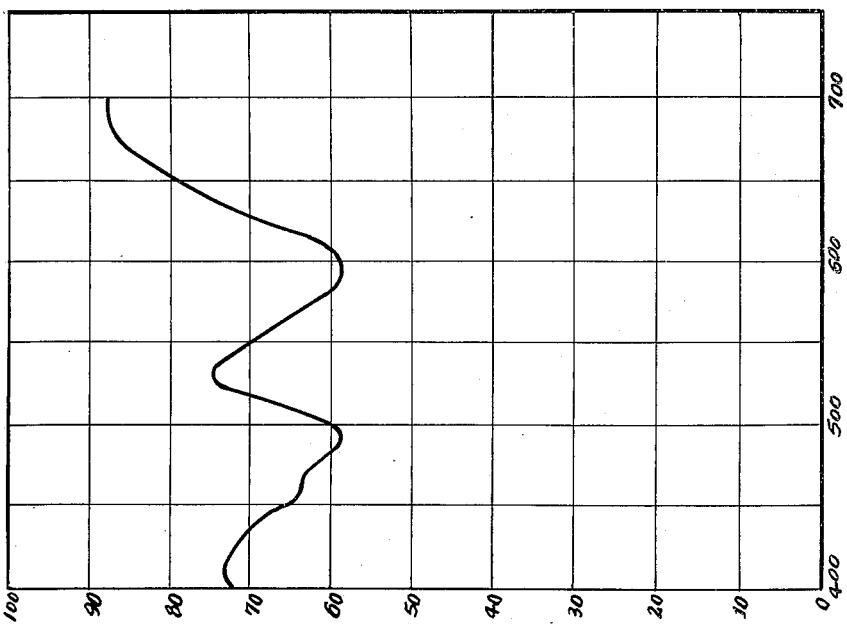
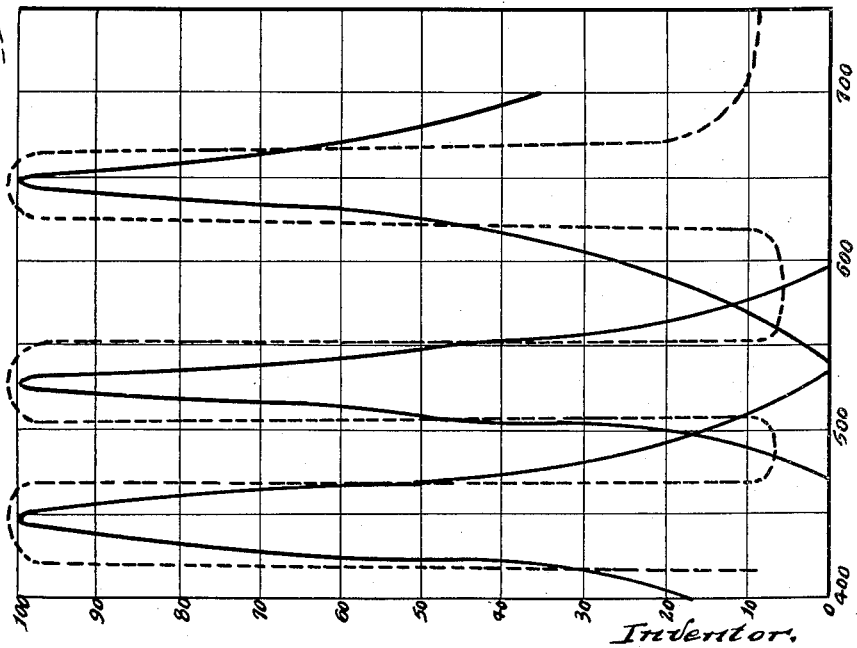
Inventor.
Jack E. Bridges
Schroeder, Hofgren, Brady & Wegner
Attorneys

United States Patent Office 3,013,114
Patented Dec. 12, 1961

3,013,114
DISPLAY DEVICE WITH CONTRAST IMPROVING OPTICAL FILTER
Jack E. Bridges, Park Ridge, Ill., assignor to Warwick Manufacturing Corporation, a corporation of Delaware
Filed Feb. 21, 1958, Ser. No. 716,780
4 Claims. (Cl. 178—5.4)

This invention is concerned with an optical filter for a display device, which filter reduces the effect of ambient light, improving the contrast and clarity of the picture displayed.

One object of the invention is the provision, in a display device having a light emissive surface with an intensity characteristic varying as a function of the wave length of the emitted light, of an optical filter for improving the contrast, the filter having a light transmission characteristic which complements the intensity characteristic of the emitted light, attenuating ambient light of wave lengths other than those emitted by the surface.

Another object is that, where the emissive surface has an intensity characteristic with a plurality of spaced maxima and minima of different wave lengths, the filter has a transmission characteristic with spaced maxima and minima corresponding with those of the emissive surface.

A further object is the provision of a display device including a display element having a light emissive surface which emits light generally in the areas of blue, green and red, color information channels supplying control signals thereto, a filter with a transmission characteristic which complements the light output of the display element, and means for adjusting the gain of the color information channels to compensate for inequalities in the characteristics of the display element and the filter.

Further objects and advantages will become apparent from the following detailed description taken in connection with the accompanying drawings, in which:

FIGURE 1 is a diagrammatic representation of a display device embodying the invention;

FIGURE 2 is an idealized graphical illustration of the light output characteristic of a cathode-ray tube and complementary transmission characteristic of a filter according to the present invention; and FIGURE 3 is a graphical illustration of the characteristic of a practical filter.

While this invention is susceptible of embodiments in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

In a display device, such as a cathode-ray tube, an image is formed on the face or screen by the action of an electron beam striking an emissive coating. The emitted light contains energy at different wave lengths and the intensity or amount of light energy is generally a function of the wave length. For example, the light output of a black and white television picture tube having a phosphor designated by Radio Corporation of America as P4, has output intensity maxima peaks at approximately 450 and 560 millimicrons, while tricolor phosphor P22 has peaks at 450, 520 and 650 millimicrons corresponding respectively with blue, green and red hues. Ambient light which generally comes from the sun, or from an artificial source as incandescent or fluorescent bulb, contains approximately the same energy at all wave lengths including those of the display device. The effect of ambient light shining on the display device is to reduce the contrast of the picture displayed thereon so that the details become indistinguishable.

Referring now to FIGURE 1, an embodiment of the invention is illustrated. A display device 10, comprising a cathode-ray tube, has a screen 11 on which an emissive surface or phosphor coating is formed. An electron beam striking the phosphor causes it to give off light. An external source of ambient light is here illustrated as an incandescent bulb 12, some of the light emitted therefrom impinging on the face or screen 11 of display device 10. In accordance with the invention, an optical filter 13 is placed in front of the screen of the display device and interposed between the screen and the viewer (not shown). Ambient light rays must pass first through filter 13, are then reflected from the face of the tube and pass again from the filter, while the light emitted by the display device passes only once through the filter. This in itself provides a certain improvement in the contrast of the picture under adverse ambient conditions, regardless of the characteristics of the filter, as the ambient light is filtered twice and the emitted light only once. However, the light emission from the display device is limited in intensity and in many cases even a slight attenuation is objectionable. Accordingly, the filter 13 has a light transmission characteristic designed to complement the light output characteristic of the display device. Stated another way, the filter 13 passes substantially without attenuation light of the wave lengths emitted by the display device while attenuating light of other wave lengths. Thus, that portion of the ambient light of a wave length different from that emitted by the display device is subjected to a double attenuation in passing through the filter twice, while the picture displayed on the device is relatively uneffected. Although some of the ambient light may have the same wave length as the light emitted by the display device, and pass the filter without attenuation, this is normally a relatively small portion of the entire light energy from the ambient source and its effect on the quality of the picture is much less than that of the entire spectrum of ambient light.

The curves of FIGURE 2 illustrate an idealized display device and filter characteristic. The solid lines represent the light output of the composite phosphor of a tricolor tube as a function of wave length, expressed in millimicrons it should be that there is a peak or maxima in the intensity of the emitted light at 440 millimicrons, 530 millimicrons and 640 millimicrons, corresponding, respectively, with the colors blue, green and red. The light output characteristic has minima occurring at wave lengths intermediate the maxima points. In accordance with the invention, the filter 13 has a light transmission characteristic of the nature indicated in broken lines, with three spaced maxima corresponding generally with the light intensity maxima of the phosphor, and with intermediate minima corresponding with the minima of the phosphor characteristic.

Ambient light having a wave length corresponding with the minimum transmission (maximum attenuation) portions of the filtered characteristic, i.e. below 420 millimicrons, from 470 to 510 millimicrons, from 550 to 620 millimicrons and above 670 millimicrons is highly attenuated by its double passage through the filter, and only that small portion of the ambient light having a wave length corresponding with the emission of the display device and the pass bands of the optical filter remains to affect the picture displayed.

The curve of FIGURE 3 shows the light transmission characteristic of a filter comprising equal parts of uranine (water soluble sodium fluoroscein) and a blue dye comprising in general sulphonic acids of dialkylamino phenyl-amino phenyl naphthophenazonium chloride, and sold under the name "Wool Fast Blue BL" by National Aniline Division of Allied Chemical & Dye Corporation. These two materials were mixed in equal parts with a clear or transparent gelatin base, in amounts of the order of $3.9 \times 10^{-6}$ grams of each component per square centimeter of filter area. This filter has transmission maxima or peaks at 420 millimicrons, 530 millimicrons and 680 millimicrons, with minima at 490 millimicrons and 590 millimicrons, correlating quite well with the idealized filter characteristic illustrated in FIGURE 2.

It will be noted from FIGURE 3 that the maxima of the curves of the filter are not all of the same amplitude. This means that the desired light output from the display device will be attenuated more in some hues than in others. This may be compensated for in the circuit of the display device, as by an amplifier with adjustable gain in the channels handling the signals which carry the information regarding intensity of the three colors. These amplifiers are shown in graphical or block form in FIGURE 1 and are designated 15, 16 and 17.

A suitable substitute for uranine is a dye sold under the name "Basic Orange 3rn" by E. I. du Pont de Nemours and Company, and having the following formula:

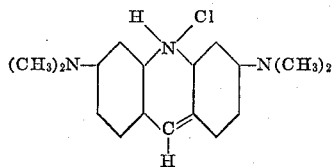

Another suitable material for a filter according to this invention is didymium glass, a glass containing didymium, a mixture of the rare earths praseodymium and neodymium.

I claim:

1. In a display device having a light emissive surface, the intensity characteristic of the emitted light varying as a function of the wave length thereof, and having a plurality of spaced maxima and minima: a homogeneous optical filter interposed between said surface and a viewer for improving the contrast of emitted light in the presence of ambient light, said filter having a light transmission characteristic which complements the intensity characteristic of the emitted light from said surface, having spaced maxima and minima corresponding respectively with the maxima and minima of said intensity characteristic, said filter transmitting substantially without attenuation light of the wave lengths emitted by said surface and attenuating ambient light of wave lengths other than those emitted by said surface.

2. In a display device having a light emissive surface, the intensity characteristic of the emitted light varying as a function of the color thereof, with maxima in the blue, green and red portions of the visible spectrum, at wave lengths of the order of 440, 520 and 640 millimicrons respectively: a homogeneous optical filter interposed between said surface and a viewer for improving the contrast of emitted light in the presence of ambient light, said filter having a light transmission characteristic which complements the intensity characteristic of the emitted light from said display device, transmitting substantially without attenuation emitted light from the emissive surface of the display device with maximum transmission at wave lengths of the order of 440, 520 and 640 millimicrons, and attenuating ambient light in portions of the visible spectrum other than areas of blue, green and red, said filter having transmission minima at wave lengths of the order of 400, 470–510, 550–620 and 670 millimicrons.

3. In a display device having a light emissive surface, the intensity characteristic of the emitted light varying as a function of the wave length thereof: an optical filter including a mixture of a blue dye with a fluoroscein compound interposed between said surface and a viewer for improving the contrast of emitted light in the presence of ambient light, said filter having a light transmission characteristic which complements the intensity characteristic of the emitted light from said surface, attenuating ambient light of wave lengths other than those emitted by said surface.

4. In a display device having a light emissive surface, the intensity characteristic of the emitted light varying as a function of the wave length thereof: an optical filter including a mixture of a blue dye composed essentially of sulphonic acids of dialkylamino phenylamino phenyl naphthophenazonium chloride and sodium fluoroscein mixed in substantially equal parts and in an amount of the order of $3.9 \times 10^{-6}$ grams per square centimeter of filter surface interposed between said surface and a viewer for improving the contrast of emitted light in the presence of ambient light, said filter having a light transmission characteristic which complements the intensity characteristic of the emitted light from said surface, attenuating ambient light of wave lengths other than those emitted by said surface.

References Cited in the file of this patent

UNITED STATES PATENTS

| | | |
|---|---|---|
| 1,694,706 | Herz | Dec. 11, 1928 |
| 2,222,414 | Kudar | Nov. 19, 1940 |
| 2,420,168 | Dimmick | May 6, 1947 |
| 2,494,992 | Ferguson | Jan. 17, 1950 |
| 2,599,739 | Barnes | June 10, 1952 |
| 2,644,854 | Sziklai | July 7, 1953 |
| 2,655,452 | Barnes et al. | Oct. 13, 1953 |
| 2,691,774 | De Gier | Oct. 12, 1954 |

OTHER REFERENCES

Kodak Wratten Filters, Eastman Kodak Co., 19th edition, FIG. 34A, page 32. (Copy in Div. 60.)

RCA TN. No. 61, December 2, 1957. (Copy in U.S. Patent Office Library.)